United States Patent
Casas-Ganem et al.

(10) Patent No.: US 12,076,598 B2
(45) Date of Patent: Sep. 3, 2024

(54) MEDICATION DISPOSAL APPARATUS AND METHODS OF MANUFACTURE AND USE

(71) Applicant: Surgical Device Innovations, LLC, Dallas, TX (US)

(72) Inventors: Jorge Casas-Ganem, Dallas, TX (US); Joshua Haney, Frisco, TX (US)

(73) Assignee: SURGICAL DEVICE INNOVATIONS, LLC, Dallas, TX (US)

( * ) Notice: Subject to any disclaimer, the term of this patent is extended or adjusted under 35 U.S.C. 154(b) by 341 days.

(21) Appl. No.: 17/467,788

(22) Filed: Sep. 7, 2021

(65) Prior Publication Data

US 2021/0402238 A1 Dec. 30, 2021

Related U.S. Application Data

(63) Continuation of application No. 15/970,623, filed on May 3, 2018, now Pat. No. 11,110,312.

(51) Int. Cl.
*A62D 3/33* (2007.01)
*B02C 19/00* (2006.01)
*B09B 3/00* (2022.01)

(52) U.S. Cl.
CPC ............ *A62D 3/33* (2013.01); *B02C 19/0075* (2013.01); *B09B 3/0075* (2013.01); *A62D 2203/10* (2013.01)

(58) Field of Classification Search
CPC .. A62D 3/33; A62D 2203/10; B02C 19/0075; B09B 3/0075
USPC ......................................................... 588/315
See application file for complete search history.

(56) References Cited

U.S. PATENT DOCUMENTS

| | | | |
|---|---|---|---|
| 11,110,312 B2 * | 9/2021 | Casas-Ganem | .......... A62D 3/33 |
| 2014/0187842 A1 | 7/2014 | Holaday et al. | |
| 2019/0336805 A1 | 11/2019 | Casas-Ganem et al. | |

* cited by examiner

*Primary Examiner* — Edward M Johnson
(74) *Attorney, Agent, or Firm* — Norton Rose Fulbright US LLP; Adam C. Rehm; Zachary D. Cleary

(57) ABSTRACT

A medication disposal apparatus includes a collection chamber to receive a medication having an active agent. The collection chamber includes a receiver having a one-way opening. The one-way opening receives the medication in the collection chamber and to impede the medication from exiting the collection chamber through the receiver. The collection chamber includes a first converter to receive the medication and/or convert the medication into a plurality of particles. The first converter is housed in the collection chamber and/or may receive the medication from the collection chamber. The first converter has a grinder with a plurality of rollers operable to convert the medication into the plurality of particles. The first converter includes a motor powered by a power source. The apparatus includes a reservoir fastened to the collection chamber and apparatus includes a second converter.

20 Claims, 3 Drawing Sheets

MEDICATION DISPOSAL APPARATUS AND METHODS OF MANUFACTURE AND USE

CROSS-REFERENCE TO RELATED APPLICATION

This application is a continuation of U.S. patent application Ser. No. 15/970,623 filed on May 3, 2018, the entire contents of which are fully incorporated by reference herein for all purposes.

BACKGROUND

1. Field

The following description relates to disposal and deactivation of medication and, in particular, a medication disposal apparatus including a collection chamber having a first converter and a reservoir having a second converter, and methods of manufacture and use.

2. Description of Related Art

Every year, millions of prescribed medications go unused. These unused medications include opioids for pain control. Opioids are substances that act on opioid receptors to produce morphine-like effects. As such, opioids are highly addictive and often result in fatal overdoses. At present, there is a high rate of opioid abuse among teenagers, which has increased the importance of properly disposing of unused medication.

Conventional medical disposal methods and tools are rudimentary and suffer from various deficiencies. Many people flush unused medication down a toilet, which is undesirable because such releases toxins into our environment and water supply. Conventional disposal tools do not fully destroy the unused medication, thereby allowing people to regain access to the unused medication.

Accordingly, there exists a need for medication disposal apparatus and a method of disposing of a medication that does not suffer from the aforementioned deficiencies, that is operable to safely dispose of medication, and is efficient, economical, and easy to manufacture and utilize.

SUMMARY

The present inventive concept provides a medication disposal apparatus and method of use with multiple stages of conversion via a grinder and a deactivator.

The aforementioned may be achieved in one aspect of the present inventive concept by providing a medication disposal apparatus with deactivator. The apparatus may include a collection chamber operable to receive a medication having an active agent. The medication may be a tablet or a pill containing a controlled substance. The collection chamber may include a receiver having a one-way opening. The one-way opening may be operable to receive the medication in the collection chamber and to impede the medication from exiting the collection chamber through the receiver.

The collection chamber may include a first converter operable to (i) receive the medication and/or (ii) convert the medication into a plurality of particles. The first converter may be housed in the collection chamber and/or may receive the medication from the collection chamber. The collection chamber may include a funnel operable to direct the medication toward the first converter. The first converter may be a grinder. The grinder may be a plurality of rollers operable to convert the medication into the plurality of particles. The first converter may include a motor powered by a power source.

The apparatus may include a reservoir. The reservoir may be fastened to the collection chamber. The apparatus may include a second converter. The second converter may be housed in the reservoir. The second converter may be operable to (i) receive the plurality of particles from the first converter, and/or (ii) deactivate the active agent. The second converter may be a fluid operable to deactivate the active agent. The fluid may be a chemical digestion solution containing activated charcoal operable to deactivate the active agent. The reservoir may include a spill resistant cover to prevent the plurality of particles and/or the fluid from entering the collection chamber from the reservoir.

The apparatus may include a fastener operable to removably secure the reservoir to the collection chamber. The fastener may include a disconnect switch operable to disconnect power to the motor from the power source. The disconnect switch may disconnect the power to the motor from the power source if the collection chamber is disconnected from the reservoir.

The aforementioned may be achieved in an aspect of the present inventive concept by providing a method of disposing the medication using the medication disposal apparatus with the deactivator. The method may include the step of converting, via the first converter, the medication into a plurality of particles. The medication may have an active agent. The first converter may be housed in the collection chamber. The method may include the step of deactivating, via the second converter, the active agent and yielding a plurality of deactivated particles. The second converter may be housed in the reservoir. The method may include the step of storing, via the reservoir, the plurality of deactivated particles.

The aforementioned may be achieved in an aspect of the present inventive concept by providing a method of manufacturing the medication disposal apparatus. The method may include the step of forming the collection chamber having the first converter. The first converter may be operable to (i) receive the medication from the collection chamber, and/or (ii) convert the medication into the plurality of particles. The method may include the step of forming the reservoir having the second converter. The second converter may be operable to (i) receive the plurality of particles from the first converter, and/or (ii) deactivate the active agent to yield the plurality of deactivated particles. The method may include the step of securing the reservoir to the collection chamber. The reservoir may be operable to store the plurality of deactivated particles.

The foregoing is intended to be illustrative and is not meant in a limiting sense. Many features of the embodiments may be employed with or without reference to other features of any of the embodiments. Additional aspects, advantages, and/or utilities of the present inventive concept will be set forth in part in the description that follows and, in part, will be apparent from the description, or may be learned by practice of the present inventive concept.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the present inventive concept is not limited to the precise embodiments and features shown. The accompanying drawings, which are incorporated in and constitute a part of this specification, illustrate an embodiment of apparatuses consistent with the present inventive concept and, together with the description, serve to explain advantages and principles consistent with the present inventive concept.

DETAILED DESCRIPTION

Figure 1:
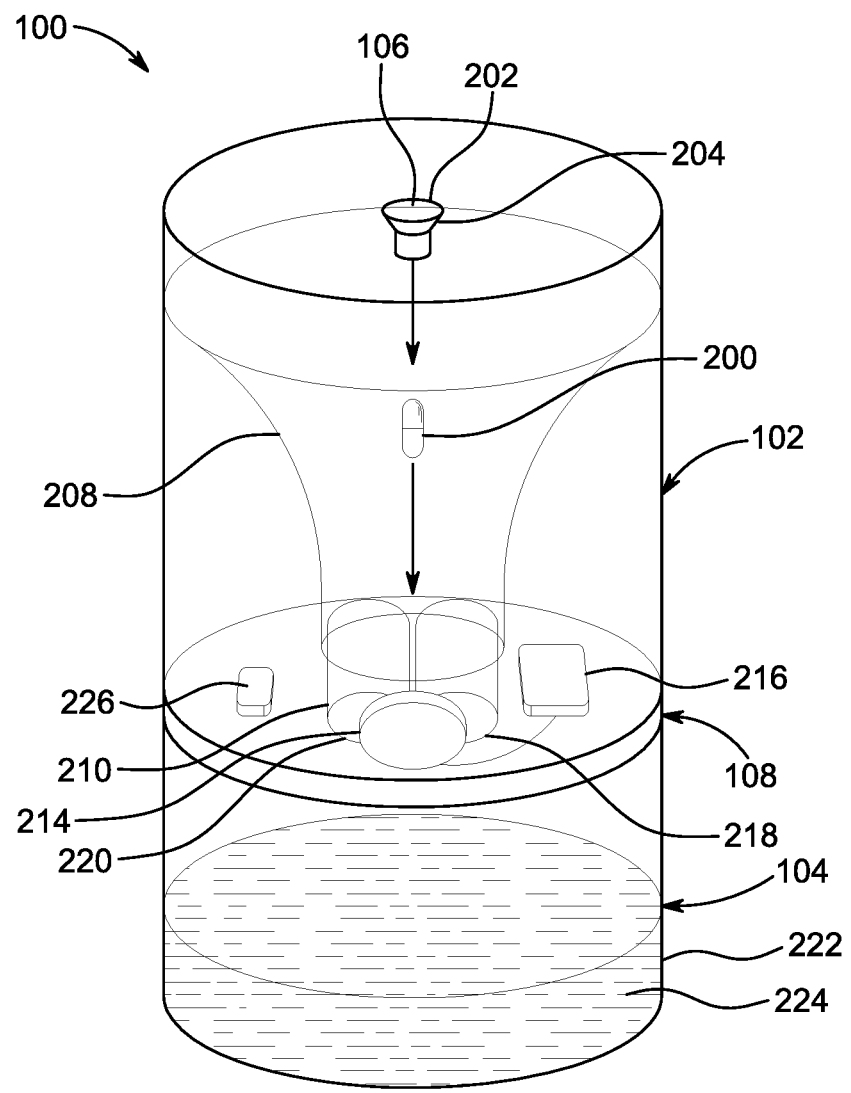
FIG. 1 is a diagram illustrating a top perspective view of a medical disposal apparatus.

It is to be understood that the present inventive concept is not limited in its application to the details of construction and to the embodiments of the components set forth in the following description or illustrated in the drawings. The figures and written description are provided to teach any person skilled in the art to make and use the inventions for which patent protection is sought. The present inventive concept is capable of other embodiments and of being practiced and carried out in various ways. Persons of skill in the art will appreciate that the development of an actual commercial embodiment incorporating aspects of the present inventive concept will require numerous implementations—specific decisions to achieve the developer's ultimate goal for the commercial embodiment. While these efforts may be complex and time-consuming, these efforts, nevertheless, would be a routine undertaking for those of skill in the art of having the benefit of this disclosure.

I. Terminology

The phraseology and terminology employed herein are for the purpose of description and should not be regarded as limiting. For example, the use of a singular term, such as, "a" is not intended as limiting of the number of items. Also, the use of relational terms such as, but not limited to, "top," "bottom," "left," "right," "upper," "lower," "down," "up," and "side," are used in the description for clarity in specific reference to the figures and are not intended to limit the scope of the present inventive concept or the appended claims. Further, it should be understood that any one of the features of the present inventive concept may be used separately or in combination with other features. Other systems, methods, features, and advantages of the present inventive concept will be, or become, apparent to one with skill in the art upon examination of the figures and the detailed description. It is intended that all such additional systems, methods, features, and advantages be included within this description, be within the scope of the present inventive concept, and be protected by the accompanying claims.

Further, any term of degree such as, but not limited to, "substantially," as used in the description and the appended claims, should be understood to include an exact, or a similar, but not exact configuration. For example, "a substantially planar surface" means having an exact planar surface or a similar, but not exact planar surface. Similarly, the terms "about" or "approximately," as used in the description and the appended claims, should be understood to include the recited values or a value that is three times greater or one third of the recited values. For example, about 3 mm includes all values from 1 mm to 9 mm, and approximately 50 degrees includes all values from 16.6 degrees to 150 degrees.

Further, as the present inventive concept is susceptible to embodiments of many different forms, it is intended that the present disclosure be considered as an example of the principles of the present inventive concept and not intended to limit the present inventive concept to the specific embodiments shown and described. Any one of the features of the present inventive concept may be used separately or in combination with any other feature. References to the terms "embodiment," "embodiments," and/or the like in the description mean that the feature and/or features being referred to are included in, at least, one aspect of the description. Separate references to the terms "embodiment," "embodiments," and/or the like in the description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present inventive concept may include a variety of combinations and/or integrations of the embodiments described herein. Additionally, all aspects of the present disclosure, as described herein, are not essential for its practice. Likewise, other systems, methods, features, and advantages of the present inventive concept will be, or become, apparent to one with skill in the art upon examination of the figures and the description. It is intended that all such additional systems, methods, features, and advantages be included within this description, be within the scope of the present inventive concept, and be encompassed by the claims.

Lastly, the terms "or" and "and/or," as used herein, are to be interpreted as inclusive or meaning any one or any combination. Therefore, "A, B or C" or "A, B and/or C" mean any of the following: "A," "B," "C"; "A and B"; "A and C"; "B and C"; "A, B and C." An exception to this definition will occur only when a combination of elements, functions, steps or acts are in some way inherently mutually exclusive.

II. General Architecture

Figure 2:
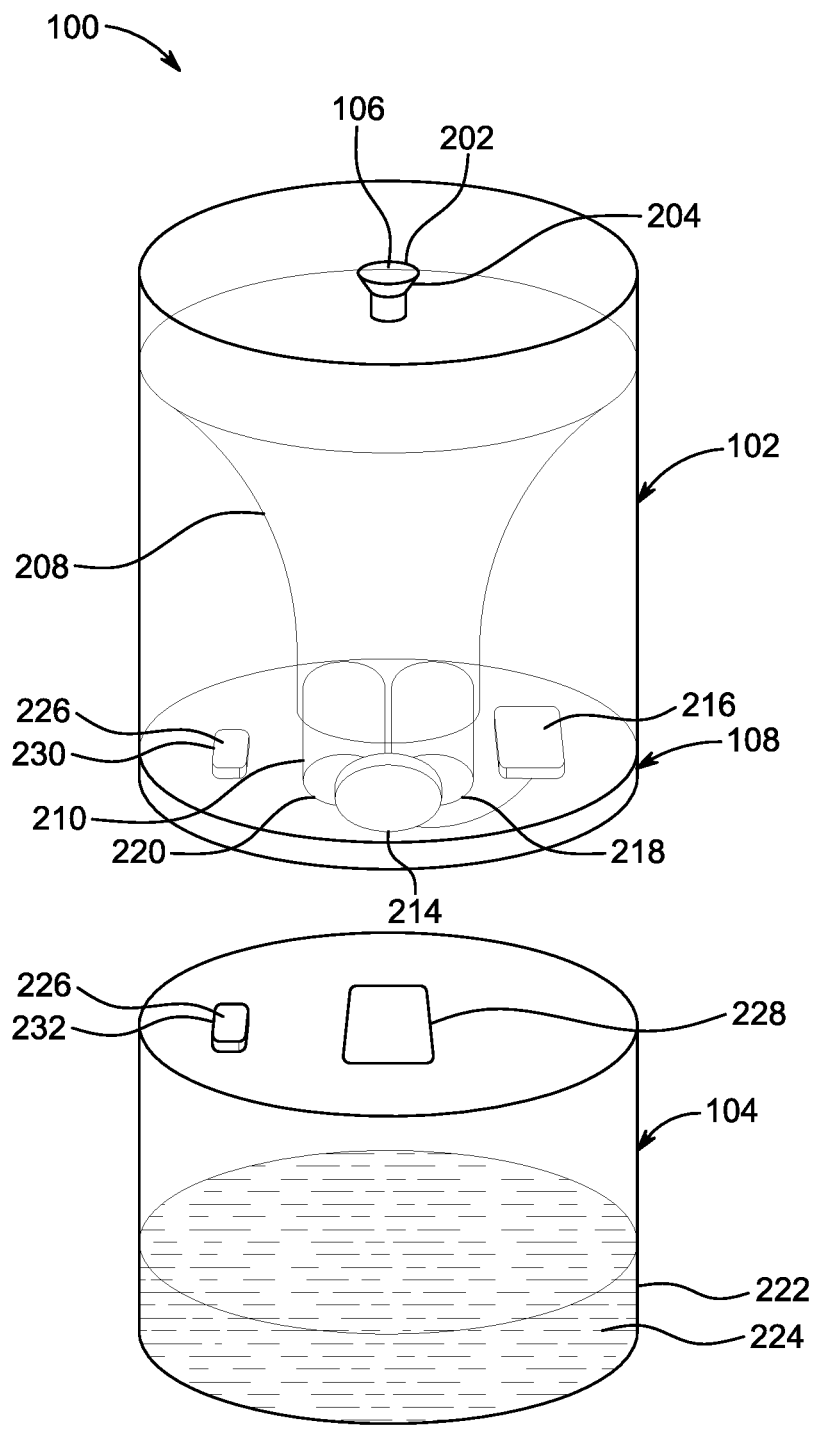
FIG. 2 is a diagram illustrating an exploded, top perspective view of the medical disposal apparatus shown in FIG. 1.
Figure 3:
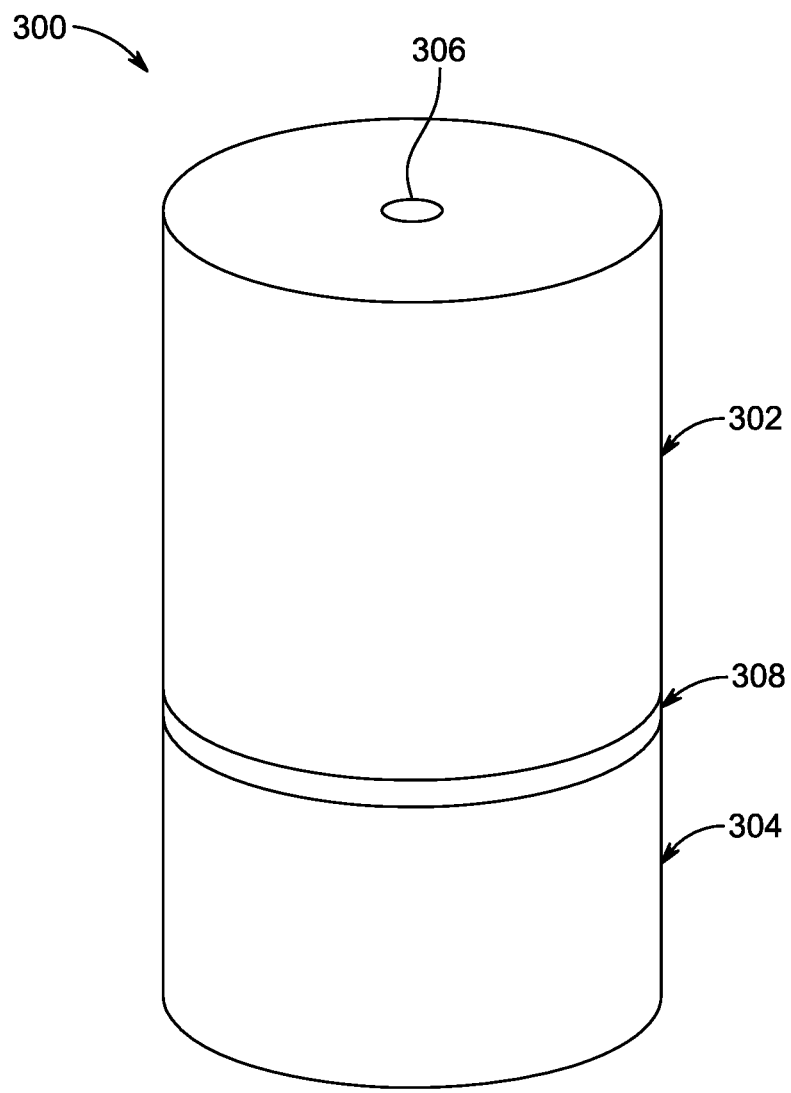
FIG. 3 is a diagram illustrating a top perspective view of another medication disposal apparatus.

Turning to FIGS. 1-2, a medication disposal apparatus 100 is illustrated. The apparatus 100 is operable to receive and dispose of a medication 200 having an active agent and is operable to prevent a user from accessing and/or using the medication 200 during disposal or subsequent thereto. In an example embodiment, the medication 200 can be a tablet or a pill containing a controlled substance, e.g. prescription medication, although the medication 200 can be a solid, a liquid, or an encapsulated liquid, without deviating from the scope of the present inventive concept.

FIG. 1 is a diagram illustrating a top perspective view of the apparatus 100. The apparatus 100 includes a collection chamber 102 coupled to a reservoir 104 via a fastener 108, e.g. screws, rivets, snap tabs, or the like. It is foreseen that the collection chamber 102 and the reservoir 104 can be manufactured as one piece or the collection chamber 102 can be coupled to the reservoir 104 by other means such as adhesion or interlocking tabs, without deviating from the scope of the present inventive concept. The collection chamber 102 is cylindrically shaped, although it is foreseen that the collection chamber 102 can be any shape such as, bulbous, hourglass, or funnel, without deviating from the scope of the present inventive concept. In the illustrated embodiment, the collection chamber 102 and the reservoir 104 are manufactured using a transparent material, although it is foreseen that the collection chamber 102 and the reservoir 104 can be translucent, opaque, or any shade of transparency without deviating from the scope of the present inventive concept.

The collection chamber 102 is operable to receive the medication 200 through a receiver 106 positioned at a top of the collection chamber 102. The receiver 106 is operable to impede the medication 200 from exiting the collection chamber 102 via a one-way opening 202, e.g. a spill proof cover, spill proof lid, or a one-way valve, although it is foreseen that the receiver 106 can be an opening or aperture, without deviating from the scope of the present inventive concept. In an exemplary embodiment, the one-way opening 202 is a one-way valve 204 with an opening sized to receive the medication 200 vertically. An end of the one-way valve 204 extending into the collection chamber 102 is sized to allow the medication 200 to pass through vertically, but impedes the medication 200 from entering the one-way valve 204 from inside the collection chamber 102. Furthermore, the end of the one-way valve 204 is spaced away from the top of the receiver 106 such that it becomes difficult for the user to position the medication 200 at the correct position and orientation to be received by the end of the one-way valve 204. In other words, if the apparatus 100 is turned upside-down or shaken in attempt to retrieve the medication 200 from the collection chamber 102, the likelihood of the medication 200 arriving at the end of the one-way valve 204 is low. In another embodiment, the one-way opening 202 is an elastic flap covering an opening sized to receive the medication 200 vertically, wherein the elastic flap is biased closed unless the flap receives an external force to open the flap. In an additional embodiment, the one-way opening 202 is an opening leading to a plurality of overlapping angled ledges, such that the medication 200 is pulled down the ledges via gravity and the angle of the ledges, but is impeded from exiting the collection chamber 102 when turned upside-down as the medication 200 would likely be caught by one of the ledges.

The collection chamber 102 houses a first converter 210 positioned at a bottom of the collection chamber 102 and operable to receive the medication 200 from the collection chamber 102 and to convert the medication 200 into a plurality of particles e.g. sand, grounds, dust, or the like. In the exemplary embodiment, the first converter 210 is entirely housed in the collection chamber 102, however it is foreseen that the first converter 210 can extend between the collection chamber 102 and the reservoir 104 or extend into the reservoir 104, without deviating from the scope of the present inventive concept. The collection chamber 102 can also include a funnel 208 operable to direct the medication 200 to the first converter 210 from the one-way opening 202. The funnel 208 can be a separate piece or the collection chamber 102 and the funnel 208 can be molded as one piece. In the illustrated embodiment, the funnel 208 is transparent, although it is foreseen that the funnel 208 can be translucent, opaque, or any shade of transparency without deviating from the scope of the present inventive concept.

In the exemplary embodiment, the first converter 210 is grinder 210 having a plurality of rollers operable to convert the medication 200 into the plurality of particles by way of grinding or crushing the medication 200. In the exemplary embodiment, the plurality of rollers includes a first roller 218 and a second roller 220 operable to rotate towards each other such that the medication 200 is pulled between the first roller 218 and the second roller 220 during use, although it is foreseen that the plurality of rollers can include more than two rollers without deviating from the scope of the present inventive concept. Each of the plurality of rollers can include a textured surface, bumps, or blades providing alternative gripping and/or crushing capabilities to the grinder 210. The collection chamber 102 includes a motor 214 powered by a power source 216, wherein the motor 214 is operable to rotate each of the plurality of rollers. In an example embodiment, the motor 214 can include a sensor in the collection chamber 102 operable to turn the motor 214 on when the medication 200 is sensed inside the collection chamber 102. The motor 214 can turn off after a fixed amount of time or when the medication 200 is no longer sensed in the collection chamber 102. In another embodiment, the motor 214 can be toggled on or off by a switch accessible to the user. In an alternative embodiment, the first converter 210 is a plurality of blades, wherein each of the blades are powered by the motor 214 and move translationally towards or away from each other such that the medication 200 is caught between two or more blades and is cut into the plurality of particles. In another alternative embodiment, the first converter 210 includes a perforated plate or screen and a block, wherein the block is held above the perforated plate until the medication 200 is received by the perforated plate. The block is then moved by the motor 214 downward to crush the medication 200 into a plurality of particles and push the plurality of particles through the perforated plate. The perforated plate can include sharpened edges providing a surface requiring a low force to break or cut the medication 200.

The plurality of particles is received, deactivated, and stored by the reservoir 104. The reservoir 104 is cylindrical similarly to the collection chamber 102, creating a generally smooth and uniform surface between the reservoir 104 and the collection chamber 102. As such, the reservoir 104 coupled with the collection chamber 102 is self-contained and compact. It is foreseen that the reservoir 104 can be any other shape such as bulbous, hourglass, or funnel, and/or can have a different size, diameter, or shape from the collection chamber 102 without deviating from the scope of the present inventive concept. The plurality of particles is received by the reservoir 104 through a reservoir opening 228 in the reservoir 104. The reservoir 104 includes a second converter 222 operable to deactivate the active agent in each of the plurality of particles and yield a plurality of deactivated particles. In the exemplary embodiment, the second converter 222 is a fluid 224 operable to deactivate the active agent. It is foreseen, that the second converter 222 may include the fluid 224 and/or one or more other fluids and/or one or more solids without deviating from the scope of the present inventive concept. For instance, the second converter 222 may be a chemical digestion solution, which may include activated charcoal, a molecular adsorption solution, a solid, e.g., activated charcoal, sand, kitty litter, silica gel, a clay-based absorbent, and/or other like liquid(s) and/or solid(s), which are capable of deactivating the active agent in each of the plurality of particles and yield the plurality of deactivated particles. The reservoir 104 is operable to store the plurality of deactivated particles. The reservoir 104 can include a spill resistant cover by which to prevent the second converter 222 and/or the plurality of deactivated particles from entering the collection chamber 102 from the reservoir 104.

The first converter 210 and the second converter 222 cooperate to convert the medication 200 into a state unusable and undesirable to the user. Indeed, after the first conversion, the plurality of particles contains the active agent and can still be used by the user. Furthermore, without the first converter 210, the second converter 222 may not be able to fully or quickly deactivate the medication 200 as the second converter 222 would need to penetrate an entirety of the medication 200 for deactivation. The user can remove the medication 200 from the second converter 222 and may be able to use a portion of the medication 200 that was not deactivated. By providing the plurality of particles from the first converter 210 to the second converter 222, the second converter 222 can quickly deactivate each of the plurality of particles simultaneously. Thus, the first converter 210 and the second converter 222 efficiently and effectively provide for complete disposal and deactivation of the medication 200.

FIG. 2 is a diagram illustrating an exploded, top perspective view of the apparatus 100. In the exemplary embodiment, the apparatus 100 includes a disconnect switch 226 at the fastener 108 coupling the collection chamber 102 to the reservoir 104. The disconnect switch 226 is operable to disconnect the power to the motor 214 from the power source 216 if the collection chamber 102 is disconnected from the reservoir 104 and render the grinder 210 unusable. The disconnect switch 226 prevents the user from singularly using the first converter 210 without the second converter 222 to obtain the plurality of particles with the active agent still present in each of the plurality of particles. In other words, if the collection chamber 102 is uncoupled from the reservoir 104, then the entire apparatus 100 is rendered unusable. Thus, the disconnect switch 226 advantageously prevents tampering of the apparatus 100 and/or the medication 200 so that, for instance, the user cannot utilize the first converter 210 to grind medication, e.g., for snorting or injection, and misuse the apparatus 100. In the exemplary embodiment, the disconnect switch 226 is a circuit having a first portion 230 in the collection chamber 102 and a second portion 232 in the reservoir 104. The first portion 230 and the second portion 232 are positioned such that when the collection chamber 102 and the reservoir 104 are coupled, the first portion 230 and the second portion 232 are in contact with each other, completing the circuit and allowing the power from the power source 216 to power the motor 214. In another embodiment, the disconnect switch 226 utilizes a sensor in the collection chamber 102 to sense movement between the collection chamber 102 and the reservoir 104 and to disconnect the power source 216 if the movement indicates that the reservoir 104 has been removed from the collection chamber 102. The disconnect switch 226 prevents the user from using the first converter 210 separately from the second converter 222, thus, advantageously providing security to the apparatus 100.

Turning to FIG. 3, another medication disposal apparatus 300 is illustrated. The apparatus 300 generally includes a collection chamber 302 coupled to a reservoir 304 via a fastener 308, e.g. screws, rivets, snap tabs, or the like. It is foreseen that the collection chamber 302 and the reservoir 304 can be manufactured as one piece or the collection chamber 302 can be coupled to the reservoir 304 by other means such as adhesion or interlocking tabs, without deviating from the scope of the present inventive concept. The collection chamber 302 is operable to receive the medication 200 through a receiver 306 positioned at a top of the collection chamber 302. The collection chamber 302 and the reservoir 304 are cylindrically shaped, although it is foreseen that the collection chamber 302 and/or the reservoir 304 can be any shape such as, bulbous, hourglass, or funnel, without deviating from the scope of the present inventive concept. The receiver 306 is operable to impede the medication 200 from exiting the collection chamber 302. In the illustrated embodiment, the collection chamber 302 and the reservoir 304 are opaque, thereby preventing the user from knowing if the medication 200 is inside the collection chamber 302 or the reservoir 304 and/or hindering retrieval of the medication 200 by the user from inside the collection chamber 302. As such, the user is discouraged from tampering or attempting to open the device 300 to obtain the medication 200. Further, retrieval of the medication 200 from inside the collection chamber 302 is hindered, as the user cannot see where to position or move the medication 200 to the receiver 306 and thus deters the user from retrieving the medication 200 from the collection chamber 302. The apparatus 300 includes generally the same internal components as the internal components of apparatus 100, described above.

The apparatus 100, 300 is manufactured by forming the collection chamber 102, 302 and the reservoir 104, 304 from plastic, e.g. injection molding, or metal, e.g. machining. The funnel 208 can be formed with the collection chamber 102, 302 or formed separately and installed into the collection chamber 102, 302. The first converter 210 and the second converter 222 are installed into the collection chamber 102, 302 and the reservoir 104, 304, respectively. The motor 214 and power source 216 are also installed into the collection chamber 102, 302. The reservoir 104, 304 is then secured to the collection chamber 102, 302 and the disconnect switch 226 is installed to prevent opening of the completed apparatus 100, 300.

During use, the medication 200 is deposited, by the user, into the one-way opening 202 and received by the collection chamber 102, 302. The medication 200 is directed to the first converter 210, as indicated by the arrows shown in FIG. 1, and converted, by the first converter 210, into the plurality of particles. The plurality of particles is then received, by the reservoir 104, 304, and the active agent in each of the plurality of particles is deactivated, by the second converter 222, yielding the plurality of deactivated particles. The plurality of deactivated particles is stored in the reservoir 104, 304. If the collection chamber 102, 302 is uncoupled or separated from the reservoir 104, 304, then the disconnect 226 disconnects power to the first converter 210 and renders the first converter 210 unusable.

One of skill in the art will recognize that the described examples are not limited to any particular size. Further, one of skill in the art will recognize that the components of the apparatus 100 are not limited to any type of material. In a preferred example, the apparatus 100 is formed of one or more plastics, but may be formed of a variety of different materials including metal or the like or rubber or the like, or a combination thereof. One skilled in the art will recognize that different diameters, types, and thicknesses of preferred materials can be utilized when taking into consideration design and stability considerations. A number of manufacturing techniques may be used such as the molding, machining, and/or casting one or more components of the foot clip. An example process of manufacturing the apparatus 100 includes use of an injection molding process or other like manufacturing means.

It will be appreciated by those skilled in the art that changes could be made to the embodiments described above without departing from the broad inventive concept thereof. It is understood, therefore, that the present invention disclosed herein is not limited to the particular embodiments disclosed, and is intended to cover modifications within the spirit and scope of the present invention.

What is claimed is:

1. A method of manufacturing a medication disposal apparatus, the method comprising:

forming a collection chamber coupled to a reservoir;

forming a first converter housed in the collection chamber and operable to convert a medication into a plurality of particles; and forming a second converter housed in the reservoir and operable to deactivate an active agent of the medication and yield a plurality of deactivated particles.

2. The method of claim 1,
wherein,
the medication disposal apparatus is a tamper-proof apparatus based on the collection chamber being coupled to the reservoir.

3. The method of claim 1,
wherein,
the reservoir is configured to store the plurality of deactivated particles.

4. The method of claim 1,
wherein,
the reservoir is disposed below the collection chamber.

5. The method of claim 4,
wherein,
the reservoir is electrically coupled to the collection chamber via a disconnect switch.

6. The method of claim 5, further comprising:
disposing a disconnect switch between the first converter and a supply of power such that uncoupling the collection chamber from the reservoir causes the supply of power to be disconnected from the first converter.

7. The method of claim 1, further comprising:
securing one or more sensors to detect a movement of the collection chamber or the reservoir, and
securing a disconnect switch to disconnect a supply of power to the first converter in response to the movement.

8. The method of claim 1,
wherein,
the collection chamber includes a receiver and a funnel, the receiver having a one-way opening operable to receive the medication in the collection chamber and to impede the medication from exiting the collection chamber through the receiver, and the funnel operable to direct the medication to the first converter.

9. The method of claim 1,
wherein,
the first converter is a grinder with one or more rollers operable to convert the medication into the plurality of particles, the grinder driven by a motor powered by a power source, and
the second converter is a chemical solution containing activated charcoal operable to deactivate the active agent.

10. The method of claim 9, further comprising:
a fastener operable to removably secure the reservoir to the collection chamber, the fastener includes a disconnect switch operable to disconnect power to the motor from the power source if the collection chamber is disconnected from the reservoir.

11. The method of claim 9,
wherein,
the reservoir includes a spill resistant cover to prevent the plurality of particles and the chemical solution from entering the collection chamber from the reservoir.

12. A method of manufacturing a medication disposal apparatus, the method comprising:
forming a first converter housed in a collection chamber coupled to a reservoir, the first converter operable to convert a medication into a plurality of particles; and
forming a second converter housed in the reservoir, the second converter operable to deactivate an active agent of the medication and yield a plurality of deactivated particles.

13. The method of claim 12,
wherein,
the reservoir is configured to store the plurality of deactivated particles.

14. The method of claim 12,
wherein,
the collection chamber being coupled to the reservoir completes an electrical circuit including the second converter.

15. The method of claim 12,
further comprising,
securing the reservoir to the collection chamber.

16. The method of claim 12,
wherein,
the collection chamber and the reservoir form a uniform surface of the medication disposal apparatus.

17. A method of manufacturing a medication disposal apparatus, the method comprising:
forming a first converter housed in a collection chamber and operable to convert a medication into a plurality of particles; and
forming a second converter housed in a reservoir operable to receive the plurality of particles from the collection chamber, the second converter operable to deactivate an active agent of the medication and yield a plurality of deactivated particles.

18. The method of claim 17,
wherein,
the reservoir is configured to store the plurality of deactivated particles.

19. The method of claim 17,
wherein,
use of the first converter is prevented in response to the collection chamber being moved relative to the reservoir.

20. The method of claim 19,
wherein,
use of the first converter is prevented by breaking an electrical circuit formed by the collection chamber and the reservoir.

* * * * *